US007825959B2

United States Patent
Desprez-le-Goarant et al.

(10) Patent No.: US 7,825,959 B2
(45) Date of Patent: Nov. 2, 2010

(54) SYSTEM AND METHOD FOR FLICKER DC OFFSET DETECTION AND CORRECTION

(75) Inventors: Yann Desprez-le-Goarant, Singapore (SG); Lookah Chua, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 434 days.

(21) Appl. No.: 11/998,525

(22) Filed: Nov. 30, 2007

(65) Prior Publication Data

US 2008/0143852 A1     Jun. 19, 2008

Related U.S. Application Data

(60) Provisional application No. 60/875,267, filed on Dec. 15, 2006.

(51) Int. Cl.
*H04N 9/73* (2006.01)
(52) U.S. Cl. .................................... 348/226.1; 348/241
(58) Field of Classification Search ................. 348/241, 348/226.1
See application file for complete search history.

(56) References Cited

U.S. PATENT DOCUMENTS

2007/0236285 A1*  10/2007  Felder ........................ 330/9

* cited by examiner

*Primary Examiner*—Jason Chan
*Assistant Examiner*—Usman Khan
(74) *Attorney, Agent, or Firm*—Lisa K. Jorgenson; William A. Munck

(57) ABSTRACT

The present disclosure provides a method for detecting flicker DC voltage offset. The method includes receiving an output signal of an image sensor, the output signal comprising a reference signal and an image signal, and generating a combined signal by combining the image signal with a peak flicker DC voltage signal during a first time period. The method also includes performing an auto zero function in an auto zeroing comparator during the first time period between the reference signal and the combined signal and comparing the reference signal and the image signal with the auto zeroing comparator during a second time period subsequent to the first time period. The method further include storing a first charge corresponding to the image signal during a second time period and storing a second charge corresponding to a current peak flicker DC voltage signal. The method also includes comparing the image signal to the current peak flicker DC voltage signal, and producing the greater of the image signal and the stored peak flicker DC voltage signal as the peak flicker DC voltage signal.

20 Claims, 7 Drawing Sheets

SYSTEM AND METHOD FOR FLICKER DC OFFSET DETECTION AND CORRECTION

CROSS REFERENCE TO RELATED APPLICATIONS

This patent application is related to U.S. patent application Ser. No. 11/290,308 entitled "FLICKER DETECTION GAIN CONTROL CIRCUIT, DIGITAL IMAGING SYSTEM, AND METHOD" filed on Nov. 29, 2005, now U.S. Pat. No. 7,598,987, which is hereby incorporated by reference in its entirety. This patent application is also related to U.S. Pat. No. 6,900,834 entitled "METHOD OF DETECTING FLICKER, AND VIDEO CAMERA USING THE METHOD" filed on Aug. 21, 2001 and issued on May 31, 2005, which is hereby incorporated by reference in its entirety.

This patent application hereby claims the priority to the U.S. provisional patent application Ser. No. 60/875,267 filed on Dec. 15, 2006. The prior provisional application is hereby incorporated by reference in its entirety.

BACKGROUND

Digital imaging devices are currently implemented in many types of electronic devices. These electronic devices may include digital still cameras, digital video cameras, mobile camera-phones, computer web-cams, and other types of devices. Semiconductor components are commonly used to capture images and digitally process the captured images. These semiconductor components may include charge coupled devices and complementary metal-oxide semiconductor (CMOS). To capture or acquire images, digital imaging devices often use a sensor array made of an arranged pattern of photodiodes. This type of sensor array is commonly known as a "pixel array." The pixel array may also be referred to as image pick-up unit hereafter.

Digital imaging devices may encounter "flicker." Artificial lighting that uses an alternating current (AC) source, such as fluorescent lighting, contains a brightness modulation component known as flicker. The frequency of flicker for artificial lighting is twice the frequency of an AC source. For example, a 50 Hz AC power system and a 60 Hz AC power system result in 100 Hz and 120 Hz flicker frequencies, respectively. Flicker typically arises during image capturing when an electronic device and the frequency of an AC source are not synchronized. As an example, a frame rate commonly used in the electronics industry is 30 Hz. When this frame rate is used, flicker can result from artificial lighting employing a 50 Hz AC power system.

Each pixel element typically includes a photodiode and other integrated circuitry. The photodiode generates a current according to the amount of light detected, and a sum charge is stored in an integrated capacitor. The stored charge is then converted into an output voltage, where the output voltage is proportional to the amount of charge stored in the capacitor. After that, an analog-to-digital converter (ADC) converts the output voltages of the pixel elements into digital values, and the digital values are processed into a digital image.

Thermal leakage always exists in an image pick-up unit and may be as significant as the detected flicker envelope. The thermal leakage, once converted into direct current (DC) voltage, may be represented as a DC voltage offset. Specifically, a pixel area is substantially larger than a pixel arranged for producing a series of signals which is a function of light. Thus, there may be a chance of imaging some part of the scene which contains a flickering light source. This large area pixel array is generally referred to as a superpixel.

SUMMARY

According to one embodiment of the present disclosure, a method for detecting flicker DC voltage offset is provided that includes receiving an output signal of an image sensor, the output signal comprising a reference signal and an image signal, and generating a combined signal by combining the image signal with a peak flicker DC voltage signal during a first time period. The method also includes performing an auto zero function in an auto zeroing comparator during the first time period between the reference signal and the combined signal and comparing the reference signal and the image signal with the auto zeroing comparator during a second time period subsequent to the first time period. The method may further include storing a first charge corresponding to the image signal during a second time period and storing a second charge corresponding to a current peak flicker DC voltage signal. The method may also include comparing the image signal to the current peak flicker DC voltage signal, and producing the greater of the image signal and the stored peak flicker DC voltage signal as the peak flicker DC voltage signal.

According to another embodiment of the present disclosure, a device is provided for removing flicker direct current (DC) offset from an output signal of an image sensor, the output signal comprising a reference signal and an image signal. The device includes a peak flicker DC voltage input, an auto zeroing comparator, configured to receive the reference signal on a first terminal and the image signal on a second terminal, and perform an auto zeroing function during a first time period. The device also includes a first switch, configured to couple the peak flicker DC voltage input to the second terminal during the first time period. Furthermore, the peak flicker DC voltage detector of the device may include a first charge storage element, configured to store a first charge corresponding to the image signal during a second time period, and a second charge storage element, configured to store a second charge corresponding to a current peak flicker DC voltage signal. The peak flicker DC voltage detector of the device may also include a second comparator, configured to compare the first charge stored in the first charge storage element and the second charge stored in the second charge storage element, wherein the first charge storage element and the second charge storage element are coupled to the peak flicker DC voltage input, and the first switch couples one of the first charge storage element and the second charge storage element to the second terminal of the auto zeroing comparator based upon an output of the second comparator.

According to another embodiment of the present disclosure, an imaging device is provided that include an image sensor configured to output a reference signal and an image signal, and a flicker DC voltage offset removal circuit. The flicker DC voltage offset removal circuit includes a peak flicker DC voltage input, an auto zeroing comparator, configured to receive the reference signal on a first terminal and the image signal on a second terminal, and perform an auto zeroing function during a first time period, and a first switch, configured to couple the peak flicker DC voltage input to the second terminal during the first time period. The imaging device further includes an image processor configured to process an output of the auto zeroing comparator. The peak flicker DC voltage detector may further include a first charge storage element, configured to store a first charge corresponding to the image signal during a second time period, a second charge storage element, configured to store a second charge corresponding to a current peak flicker DC voltage signal, and a second comparator, configured to compare the first charge stored in the first charge storage element and the second charge stored in the second charge storage element. Furthermore, the first charge storage element and the second charge storage element may be coupled to the peak flicker DC voltage input, and the first switch may couple one of the first charge storage element and the second charge storage element to the second terminal of the auto zeroing comparator based upon an output of the second comparator.

According to yet another embodiment of the present disclosure, a circuitry for detecting and removing flicker DC offset is provided that includes an image pickup unit configured to output a plurality of flicker DC voltage signals for a plurality of captured pixels. The circuitry also includes a flicker DC offset detection module that comprises a first charge storage element configured to hold a first flicker charge corresponding to a first flicker DC voltage signal, a second charge storage element configured to hold a second flicker charge corresponding to a second flicker DC voltage signal, and a first comparator configured to compare the first flicker DC voltage signal with the second flicker DC voltage signal and to identify a peak flicker DC voltage signal. The circuitry further includes a flicker DC offset removal module that comprises a second comparator configured to compare the peak flicker DC voltage signal with a reference signal, to identify an offset between the peak flicker DC signal and the reference signal, and to remove the offset using an auto zeroing feature.

According to yet another embodiment of the present disclosure, an imaging device is provided that include an image pickup unit configured to output a plurality of flicker DC voltage signals for a plurality of captured pixels, and a flicker DC voltage offset detection and removal circuitry configured to identify a peak flicker DC voltage signal, to detect an offset between the peak flicker DC voltage signal and a reference signal, and to remove the offset using an auto zeroing feature. The imaging device also includes at least one analog-to-digital converter (ADC) configured to convert the plurality of voltage signals into a plurality of digital signals and a plurality of post-ADC processing components.

According to yet another embodiment of the present disclosure, a method for detecting and removing an flicker DC offset is provided that includes generating a plurality of flicker DC voltage signals, identifying a peak flicker DC voltage signal, detecting a flicker DC offset between the peak flicker DC voltage signal and a reference signal, and removing the flicker DC offset via auto zeroing.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
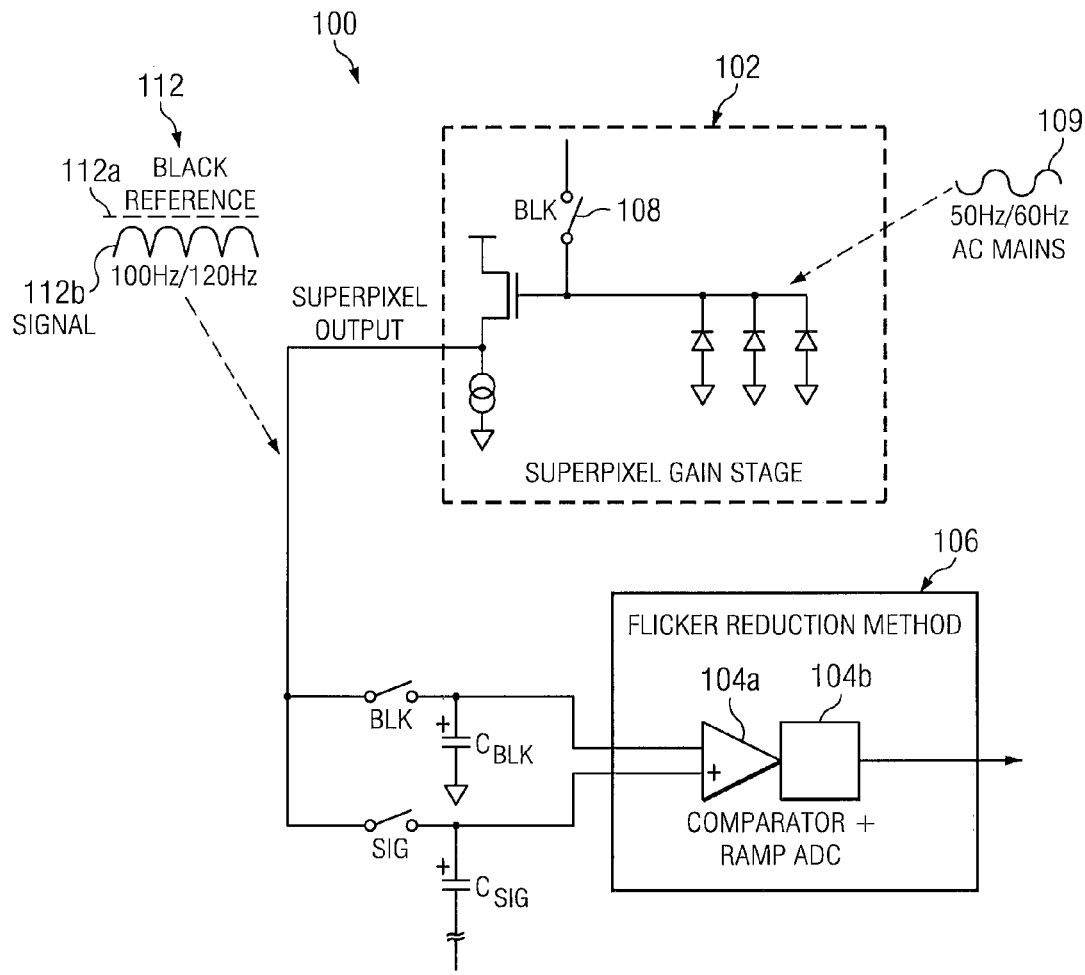
FIG. 1 illustrates a flicker detection system.
Figure 1:
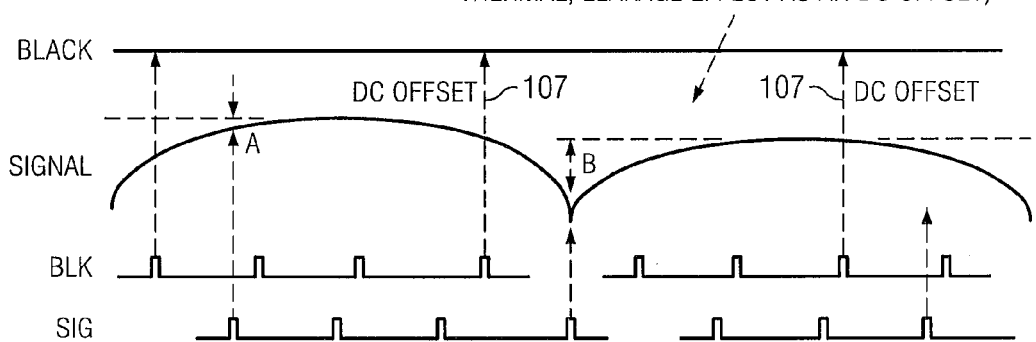

FIG. 1 presents an electrical schematic diagram of a digital image capture device 100. The image capture device 100 includes a superpixel gain stage 102 (or other image sensor) coupled to a digitization stage 106. The digitization stage 106 includes a comparator 104a and an ADC 104b. In response to a visible light signal 109, the superpixel gain stage 102 produces an electronic signal 112.

The signal 112 includes two components. When black switch 108 is closed, the signal 112 is at a black reference level 112a. When the black switch 108 is open, the signal 112 is at a signal level 112b, which represents a combination of light from the image with a flicker component from artificial lighting and a DC offset from thermal and leakage effects in the gain stage 102. The flicker DC offset 107, as shown in the bottom half of FIG. 1, may be represented as a difference between the image signal and the black reference signal. While the flicker component is represented in the signal 109 and the signal 112 as a sinusoidal waveform, it will be understood that the flicker may be of other forms other than a sinusoidal wave.

The flicker voltage output and the DC components are fed through the comparator 104a and ADC 104b. Thus, the effective range of ADC 104b may be limited by the DC components (which are unwanted) especially in conditions where the DC offset is of significant magnitude as compared to flicker amplitude such as, for example, at higher operating temperatures.

Large pixel areas may be needed to detect light flicker envelope. Thermal leakage may be dependent on pixel area and the process used and often appears as a DC offset. Any unwanted DC voltage could be significant as the detected flicker envelope. Therefore, there is a need to reduce this DC offset prior to ADC conversion, or the DC offset may limit the effectiveness in subsequent flicker correction in the digital domain. Conventional methods address flicker detection and correction in the digital domain without canceling this DC offset effect.

The present disclosure provides a system and a method that enables the DC offset detection and correction in the analog domain. The system and method may be easily integrated into analog circuits within the sensor array without external components and without additional digital signal processing (DSP) units.

Figure 2:
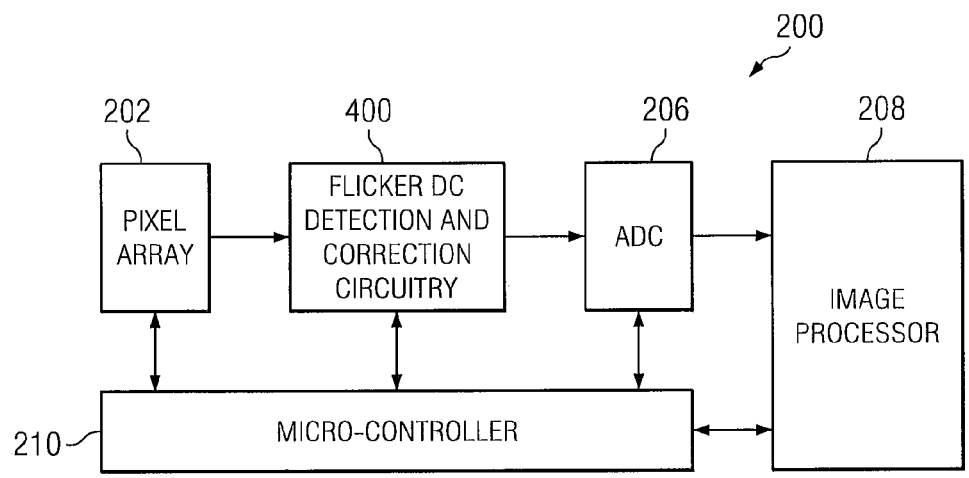
FIG. 2 illustrates a digital imaging system having a flicker DC offset detection and correction circuitry according to one embodiment of this disclosure.

FIG. 2 illustrates a digital imaging system 200. The embodiment of the digital imaging system 200 shown in FIG. 2 is for illustration only. Other embodiments of the digital imaging system 200 may be used without departing from the scope of this disclosure.

The digital imaging system 200, in this example, includes a pixel array 202, also referred to as an image pick-up unit hereafter, a flicker DC offset detection and correction circuitry 400, an ADC 206, a microcontroller 210, and an image processor 208. The digital imaging system 200 may be employed in a digital camera, a digital video camera, a digital camera-phone, or any other suitable device.

The pixel array 202 is capable of receiving light and generating outputs representing an image. For example, the pixel array 202 may measure an intensity of ambient light to generate outputs representing an image. The pixel array 202 includes any suitable structure or structures for generating outputs representing an image. As an example, the pixel array 202 could include an arranged pattern of photodiodes and other electronic circuitry.

Figure 4:
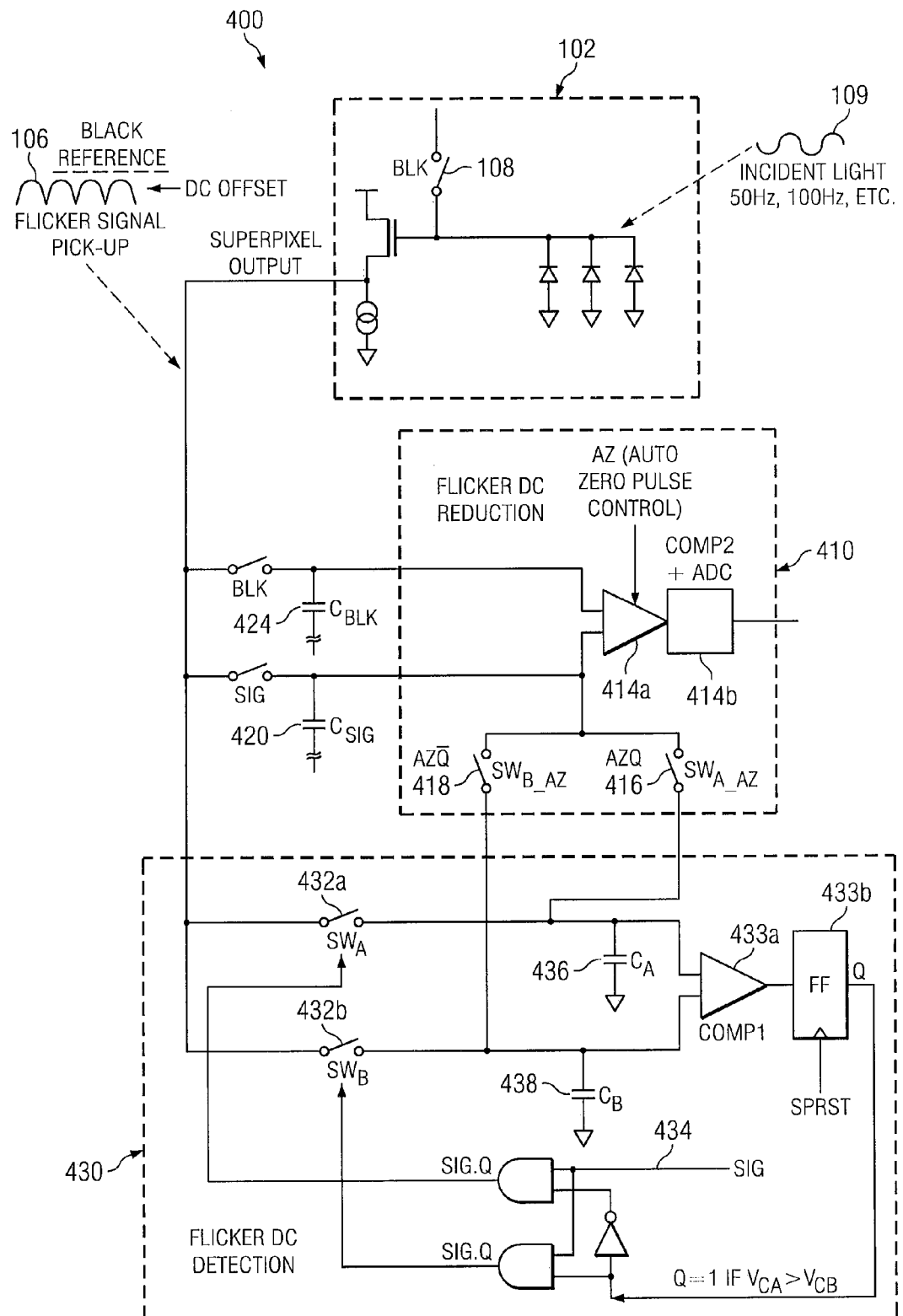
FIG. 4 illustrates a timing diagram of a flicker DC offset detection and correction system according to one embodiment of the present disclosure.

The flicker DC offset detection and correction circuitry 400 is operable to detect a flicker DC offset in the analog domain. The flicker DC offset detection and correction circuitry 400 is further operable to correct the detected DC offset through an auto zeroing feature. Details of the flicker DC offset detection and correction circuitry 400 is depicted in FIG. 4 and described hereafter.

The analog-to-digital converter 206 is configured to receive analog input signals and convert the analog signals into digital output signals. For example, the analog-to-digital converter 206 could convert analog signals representing a captured image into digital values. In addition, the analog-to-digital converter 206 could also convert analog signals representing the current lighting conditions into digital values. The analog-to-digital converters 206 may include any hardware, software, firmware, or combination thereof for converting analog signals into digital signals. Although shown as a single component in FIG. 2, the analog-to-digital converter 206 could be implemented as separate converters.

The image processor 208 may include one or more circuits or modules that perform imaging related processing in the digital domain. One such processing module is a flicker detector that is capable of monitoring lighting conditions so that the digital imaging system 200 may be adjusted to an appropriate lighting frequency. For example, the flicker detector may detect whether there is flicker from the ambient lighting, such as fluorescent or other artificial lighting. As a particular example, if an output signal from the flicker detector includes only a DC component, the flicker detector may be detecting an absence of flicker. If the output signal from the flicker detector includes an AC component, the flicker detector has detected some amount of flicker.

The microcontroller 210 is capable of controlling the operations of the digital imaging system 200. For example, based on data received from the analog-to-digital converter 206, the microcontroller 210 could generate control signals for the pixel array 202, the flicker DC offset detection & correction circuitry 400, and the image processor 208. This may allow, for example, the microcontroller 210 to use the output of the post ADC image processor 208 such as a flicker detector to determine whether to adjust the operation of the pixel array 202 to reduce or eliminate the effects of flicker. The microcontroller 210 may include any hardware, software, firmware, or combination thereof for controlling the operation of the digital imaging system 200.

In some embodiments, the microcontroller 210 may control the brightness of a captured image by adjusting the integration time or exposure timing of the pixel array 202 or controlling an analog signal before the analog-to-digital converter 206. For example, the pixel array 202 could operate with an exposure timing of 13 ms as the correct brightness. The flicker detector of the post ADC processing unit 208 may detect the ambient lighting and produce an output signal. If the output signal includes only a DC component, the microcontroller 210 may not need to change the exposure timing of the pixel array 202. If the output signal includes an AC component corresponding to a 50 Hz AC power system, there is flicker, and the exposure timing or integration time $T_{int}$ of the flicker detector may be significantly shorter than the flicker period to effectively sample the flicker. As a particular example, a VGA system operating at 30 frames per second may use a frame period of 33 ms and 550 lines per frame. The line period, referred to as the integration time Tint, is 33 ms/550=60 µs. Therefore, the flicker detector may use $T_{int}$ with a specified value of 60 µs for either a 50 Hz or 60 Hz AC power system.

Figure 3:
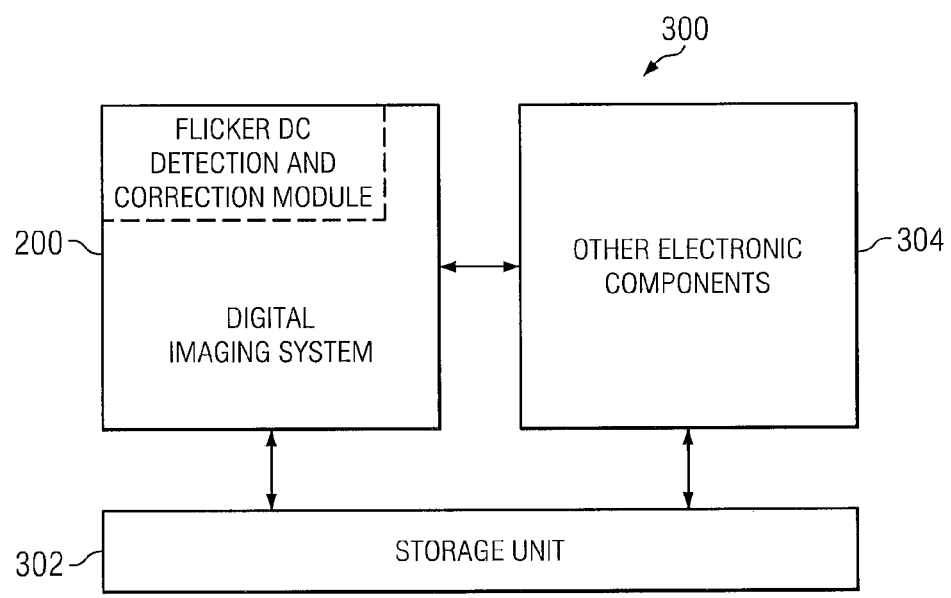
FIG. 3 illustrates an electronic device having the digital imaging system according to one embodiment of this disclosure.

FIG. 3 illustrates an electronic device 300 according to one embodiment of this disclosure. The embodiment of the electronic device 300 shown in FIG. 3 is for illustration only. Other embodiments of the electronic device 300 may be used without departing from the scope of this disclosure.

The electronic device 300 includes the digital imaging system 200 as shown in FIG. 2. The electronic device 300 may also include a storage unit 302 and other electronic components 304. The storage unit 302 is capable of storing and facilitating retrieval of digital data representing one or more captured images. The digital data representing a captured image may, for example, include the output of the analog-to-digital converter 206 of FIG. 2. The storage unit 302 may also include any suitable volatile or non-volatile storage and retrieval device or devices, such as a flash memory.

The other electronic components 304 in FIG. 3 may provide any suitable functionality depending on the electronic device 300. For example, if the device 300 represents a mobile camera-phone, the other electronic components 304 may represent circuitry for transmitting the captured images over a communication network. If the device 300 represents a digital still camera, the other electronic components 304 could represent controls used to initiate image capture, make adjustments to the digital imaging system 200, or delete captured images. The other electronic components 304 could implement any other or additional functionality.

Although FIG. 3 illustrates one example of an electronic device 300 having the digital imaging system 200, various changes may be made to FIG. 3. For example, the electronic device 300 could include any other or additional components depending on particular needs. Also, the digital imaging system 200 may be used in any other suitable device or system.

FIG. 4 is a diagram of a flicker DC offset detection and correction system 400 according to one embodiment of the present disclosure. The flicker DC offset detection and correction system 400 may include a flicker DC offset detection module 430 and a flicker DC offset correction module 410.

The flicker DC offset detection module 430 may include two charge storage capacitors $C_A$ 436 and $C_B$ 438, two metal oxide semiconductor (MOS) switches $SW_A$ 432a and $SW_B$ 432b, a comparator 433a and the associated logic circuits such as a flip flop and reset circuit 433b. The capacitors 436 and 438 cooperate with the comparator 433a to turn on or to pulse the MOS switches pair $SW_A$ 432a or $SW_B$ 432b. When the voltage signals for the flicker lighting arrive at the DC offset detection module 430, a peak signal or the offset signal goes into either the capacitor $C_A$ 436 or the capacitor $C_B$ 438 depending on the state of the DC offset detection module 430. The comparator 433a decides which of the capacitor $C_A$ 436 or $C_B$ 438 to hold or sample voltage from the output of the image pick up unit according to the result of the decision logic 443a and 443b.

The operations performed at the flicker DC offset detection module 430 may include: a) Receiving a plurality of flicker DC voltage signals representing captured pixels from the associated image pick up unit at the capacitor $C_A$ and the capacitor $C_B$; b) Comparing a newly received flicker DC voltage signal against a previous peak flicker DC voltage signal and storing the new peak if the new flicker DC voltage signal is greater than the previous peak flicker DC signal. Specifically, if the voltage at $C_A$ is greater than the voltage received at $C_B$, then the switch $SW_A$ 432a is off and the switch $SW_B$ 432b is driven by the pulse signal. Otherwise, the switch $SW_B$ 432b is pulsed and the switch $SW_A$ is driven by the pulse signal SIG; and c) Storing or memorizing the new peak flicker DC voltage signal in either $C_A$ or $C_B$ depending on the closure of switch $SW_A$ or switch $SW_B$.

The flicker DC offset correction module 410 may include a DC offset correction comparator 414a and two auto zeroing MOS switches $SW_{A\_AZ}$ 416 and $SW_{B\_AZ}$ 418. The DC offset correction comparator 414a is coupled to an ADC 414b. The DC offset correction comparator 414a is configured with an auto zeroing feature. The DC offset correction circuitry 410 may be associated with an image pick up unit such as the pixel array 202.

The operations at the flicker DC offset correction module 410 may include: a) Receiving at the positive terminal $C_{sig}$ of the comparator 414a a peak flicker DC voltage signal from the flicker DC offset detection module 430 via either the switch $SW_{A\_AZ}$ 416 or the switch $SW_{B\_AZ}$ 418; b) Receiving a black reference signal at the terminal $C_{blk}$ of the comparator 414a from the image signal pickup unit; c) Identifying a difference or a flicker DC voltage offset between the peak flicker voltage signal and the black reference signal by comparing the two signals; and d) Correcting the identified flicker DC voltage offset using the auto zeroing feature.

The auto zeroing feature allows the flicker DC offset correction module 410 to reduce the flicker DC voltage of the image voltage signals or input signals. The goal is to have the input signals trend toward the reference signal. In one embodiment of the present disclosure, the flicker DC voltage offset may be corrected for each framing cycle, or a pixel sampling period. In another embodiment, an offset correction operation may be performed over multiple sampling cycles.

Figure 5:
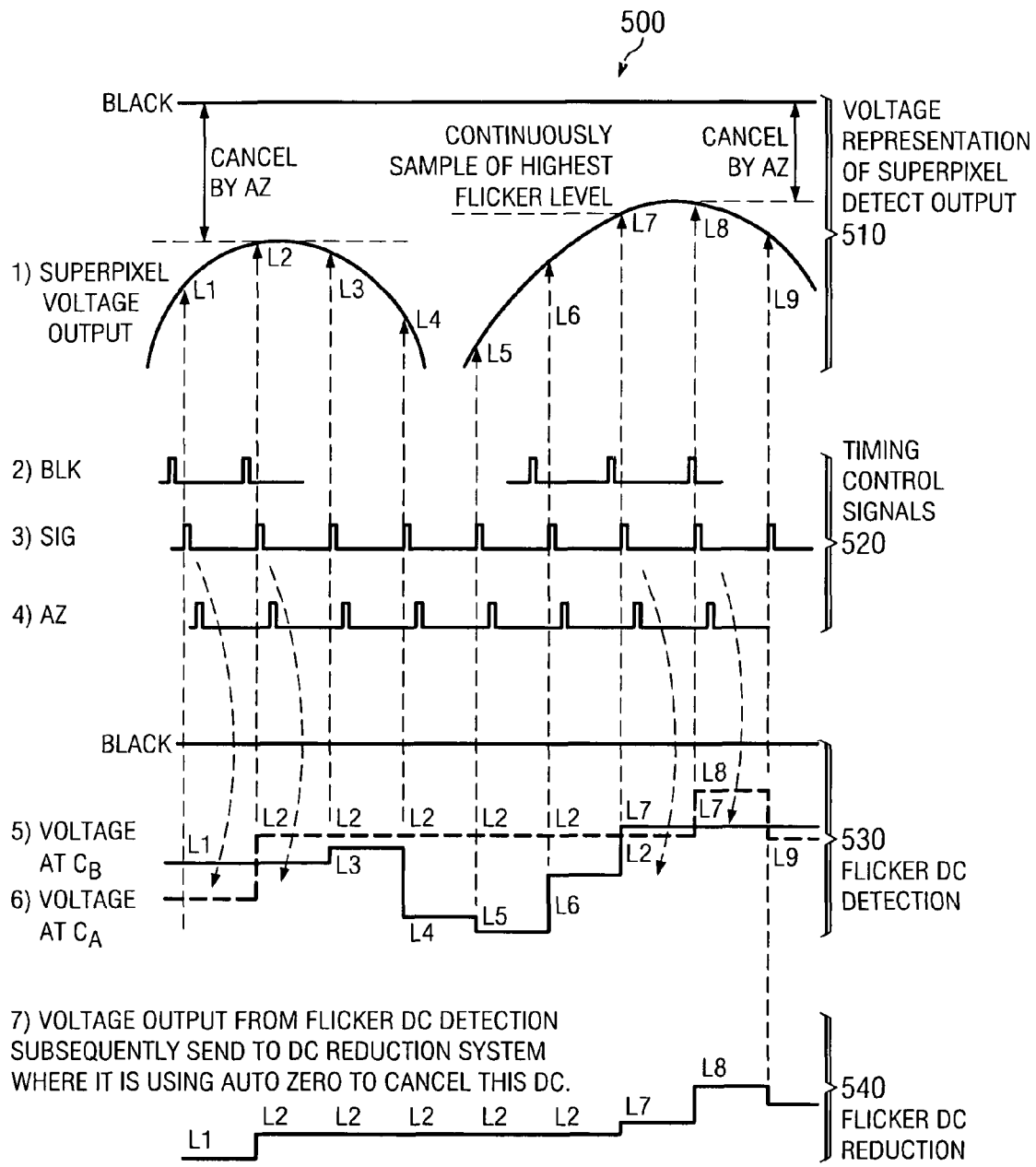
FIG. 5 illustrates a diagram of a flicker DC offset detection and correction system according to one embodiment of the present disclosure.

FIG. 5 is a superimposed timing diagram 500 of a flicker DC offset detection and correction operation according to one embodiment of the present disclosure. The timing diagram 500 includes a diagram of pixel voltage output 510, a timing control diagram 520, a flicker DC offset detection diagram 530, and a flicker DC offset correction diagram 540. The timing diagram 500 generally illustrates the relationship between a voltage output of the superpixel or image pickup stage 102, the timing control signals, outputs of the flicker DC offset detection module 430 and outputs of the DC offset correction module 410. The superpixel stage voltage output represents both a pixel output voltage and a black or zero output.

The superpixel voltage output diagram 510 includes nine voltage outputs, or nine samplings of pixels as voltage output, from L1 to L9. A black light signal provides a reference signal or a base signal. A sampling cycle in the timing control diagram 520 may include a time point for a black (BLK) signal, a time point for an input voltage signal (SIG), and a time point for the auto zeroing (AZ) operation. According to one embodiment of the present disclosure, the first step of a frame sampling cycle is pulsing the black reference signal, which represents the pixel charge reset. The following step is pulsing the input image voltage signal, which represents a pixel read. Then the third step is auto zeroing operation, which designates the pulse for auto zeroing of the pixel comparator 414a as shown in FIG. 4.

Flicker DC detection diagram 530 shows that the detected flicker voltage levels are stored at the capacitor $C_A$ at the pixel sampling cycles L3, L4, L5 and L6. The flicker voltage levels are stored at the capacitor $C_B$ at the pixel sampling cycles L1, L2, L7 and L8. These peak voltage levels will then be used for DC offset correction using the auto zeroing feature described in conjunction with FIG. 4 herein. The flicker DC offset correction diagram 540 shows the peak flicker DC levels that are corrected at the flicker DC offset reduction module 410. These peak flicker DC levels include the flicker voltage levels "memorized" at the pixel sampling cycles L1, L2, L7 and L8.

Figure 6:
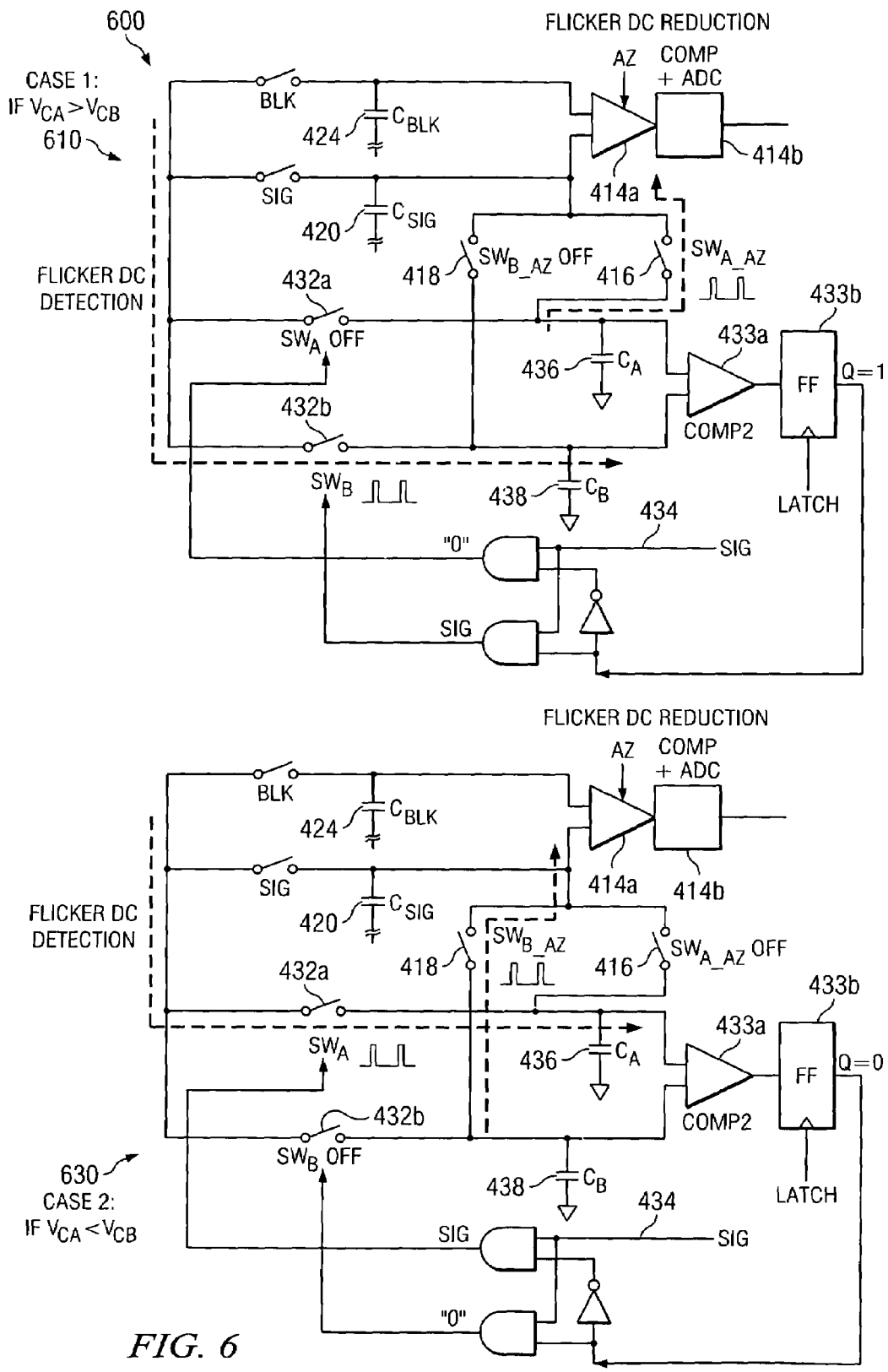
FIG. 6 illustrates a flicker DC offset detection system with two scenarios according to one embodiment of the present disclosure.

FIG. 6 illustrates a flicker DC offset detection system and two scenarios, the scenario 610 and scenario 630, according to one embodiment of the present disclosure. The scenario 610 shows that if an input flicker DC voltage at the capacitor $C_A$ 436 is greater than the voltage at the capacitor $C_B$ 438, then the switch $SW_A$ 432a is turned "off" and the switch $SW_B$ 432b is driven by the pulse SIG. In the scenario 630, if the voltage at the capacitor $C_A$ 436 is less than the voltage at the capacitor $C_B$ 438, then the switch $SW_B$ 432b is turned "off" and the switch $SW_A$ 432a is driven by the pulse SIG. As a result, the peak flicker DC levels are stored in either the capacitor $C_A$ 436 in the scenario 630 or the capacitor $C_B$ 438 in the scenario 610.

Figure 7:
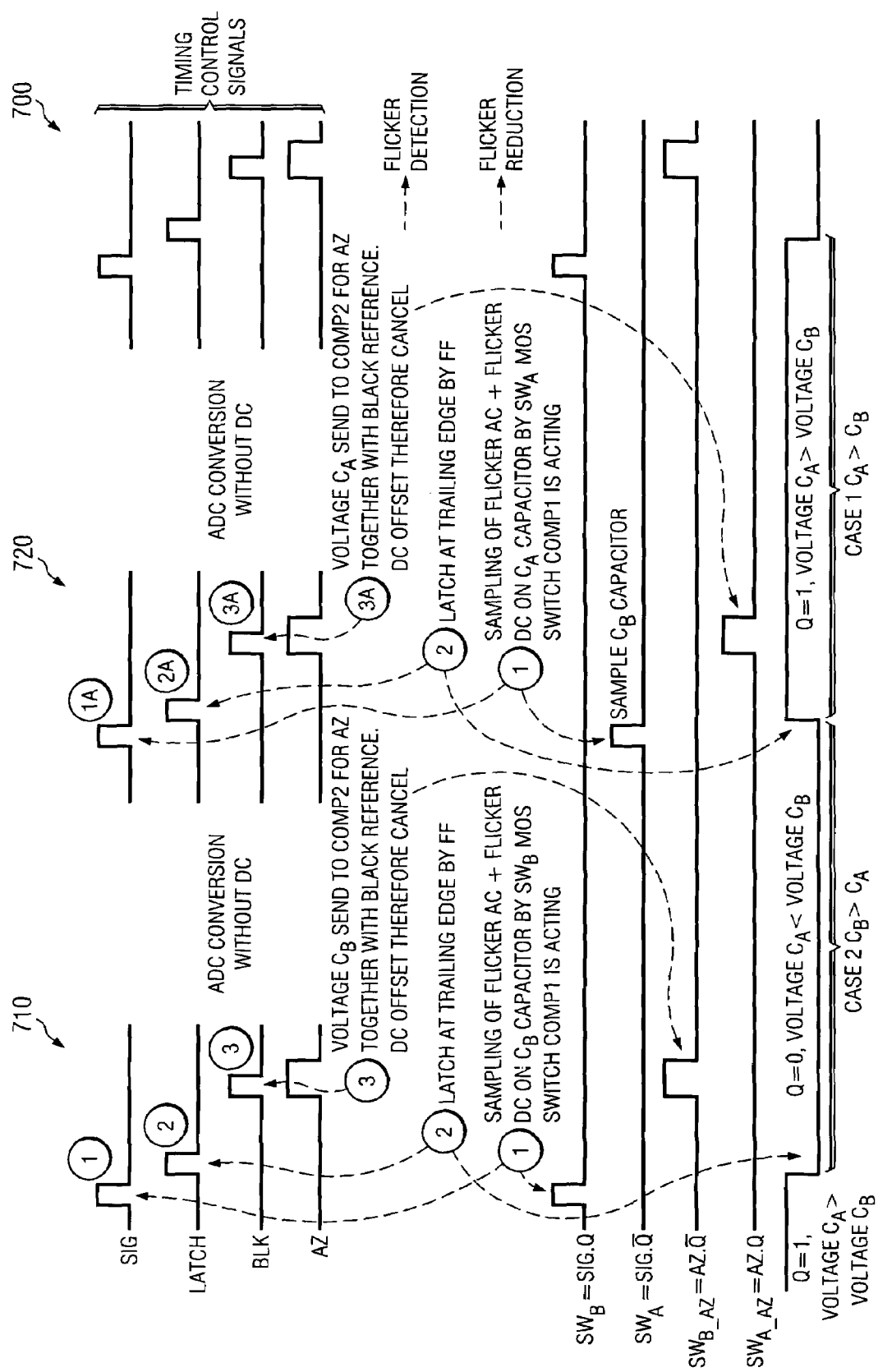
FIG. 7 illustrates timing diagrams for flicker DC offset detection and removal.

FIG. 7 illustrates timing diagrams 700 for flicker DC voltage offset detection and removal for two scenarios. The timing diagrams 700 include a timing diagram 710 for the scenario where the voltage in the capacitor $C_B$ 438 is greater than the voltage in $C_A$ 436. At step 1 of the timing diagram 710, flicker AC and DC voltages are sampled at the capacitor $C_B$ 438 as controlled by the switch $SW_B$ 432b. Subsequently the trailing edge of the flip and flop 433b is latched on at step 2. Then the black reference signal is pulsed at step 3. At the same time, the voltage at the $C_B$ 438 along with the black reference signal is sent to the comparator 414a and the offset is cancelled through the auto zeroing feature.

The timing diagram 700 also includes a timing diagram 720 for the scenario where the voltage in the capacitor $C_B$ 438 is less than the voltage in the capacitor $C_A$ 436. At the step 1A of the timing diagram 720, flicker AC and DC voltages are sampled at the capacitor $C_A$ 438 as controlled by the switch $SW_A$ 432a. Subsequently the trailing edge of the flip and flop 433a is latched on at step 2A. Then the black reference signal is pulsed at step 3A. At the same time, the voltage at the $C_A$ 436 along with the black reference signal is sent to the comparator 414a and the offset is cancelled through the auto zeroing feature.

Figure 8:
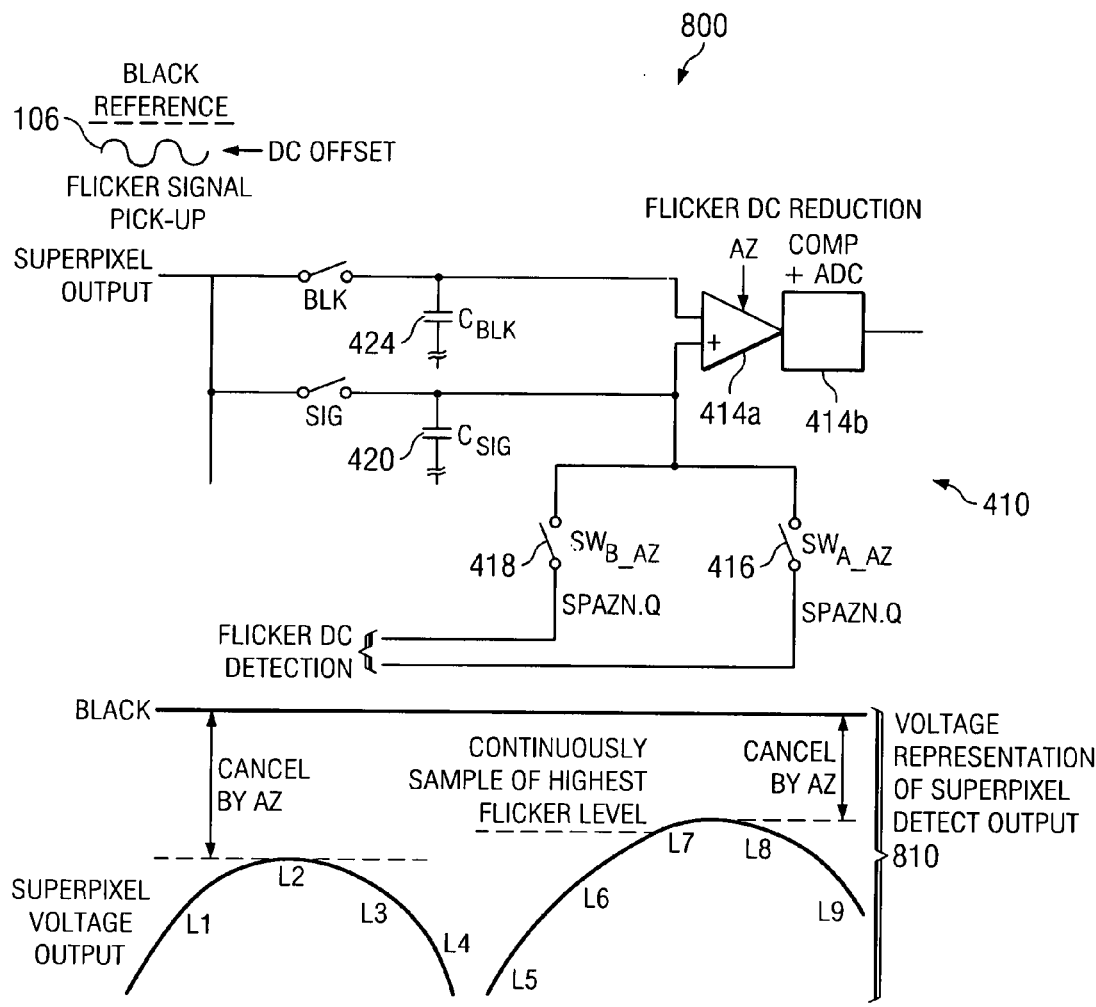
FIG. 8 shows a graphical representation of a flicker correction according to one embodiment of the present disclosure.

FIG. 8 shows a combination 800 of a flicker DC offset correction module and a correction scenario according to one embodiment of the present disclosure. The combination 800 includes the flicker DC offset correction module 410 and scenarios 810 and 820. The flicker DC offset correction module 410 may include a comparator 414a with a wide range auto zeroing feature and a pair of MOS switches $SW_{A\_AZ}$ 416 and $SW_{B\_AZ}$ 418 (as shown in FIG. 4). The simple decision logic of the flicker DC offset detection module 430 (not shown in FIG. 7) may send only the highest of the lighting flicker level to the positive terminal $C_{SIG}$ 420 of the comparator 414a through either the switch $SW_{A\_AZ}$ 216 or the switch $SW_{B\_AZ}$ 218.

The flicker DC offset correction scenario 810 shows correction or cancellation of three offsets for the sampling cycles from L1 through L9. The first offset is corrected or cancelled via the auto zeroing feature for the sampling cycle L2 through L6. The second offset is canceled for the sampling period L7. The third offset is canceled for the sampling period L8. The flicker DC offset correction scenario 820 shows the DC voltage levels that are passed to an ADC after the offset corrections for the conversion into digital signals. The digitals signals represent the DC voltages without the offsets.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "correction" in the phrase "flicker DC voltage offset correction" may be used interchangeably with the term "removal", the term "reduction" or their variants in the same context. Similarly, the term "circuitry" in the phrase "flicker DC offset detection and correction circuitry" may be used interchangeably with the term "device', the term "system", the term "module" or their variants in the same or similar contexts.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device for removing flicker direct current (DC) offset from an output signal of an image sensor, the output signal comprising a reference signal and an image signal, the device comprising:
   a peak flicker DC voltage input;
   an auto zeroing comparator, configured to
      receive the reference signal on a first terminal and the image signal on a second terminal, and
      perform an auto zeroing function during a first time period; and
   a first switch, configured to couple the peak flicker DC voltage input to the second terminal during the first time period.

2. The device of claim 1, further comprising a peak flicker DC voltage detector, configured to produce from the image signal a peak flicker DC voltage signal at the peak flicker DC voltage input.

3. The device of claim 2, wherein the peak flicker DC voltage detector comprises:
   a first charge storage element, configured to store a first charge corresponding to the image signal during a second time period;
   a second charge storage element, configured to store a second charge corresponding to a current peak flicker DC voltage signal; and
   a second comparator, configured to compare the first charge stored in the first charge storage element and the second charge stored in the second charge storage element,
   wherein
      the first charge storage element and the second charge storage element are coupled to the peak flicker DC voltage input, and
      the first switch couples one of the first charge storage element and the second charge storage element to the second terminal of the auto zeroing comparator based upon an output of the second comparator.

4. The device of claim 3, wherein the first charge storage element is a first capacitor and the second charge storage element is a second capacitor.

5. The device of claim 3, further comprising a second switch, configured to couple the image signal to the first charge storage element and the second charge storage element based upon the output of the second comparator.

6. The device of claim 3, wherein, based upon the output of the second comparator, the peak flicker DC voltage detector operates in a second configuration, wherein the first charge storage element is configured to store the first charge corresponding to the current peak flicker DC voltage signal and the second charge storage element is configured to store the second charge corresponding to the image signal during a second time period.

7. The device of claim 1, further comprising an analog-to-digital convertor coupled to an output of the auto-zeroing comparator.

8. An imaging device, comprising:
   an image sensor configured to output a reference signal and an image signal;
   a flicker DC voltage offset removal circuit comprising:
      a peak flicker DC voltage input;
      an auto zeroing comparator, configured to receive the reference signal on a first terminal and the image signal on a second terminal, and perform an auto zeroing function during a first time period; and
      a first switch, configured to couple the peak flicker DC voltage input to the second terminal during the first time period;
   an image processor configured to process an output of the auto zeroing comparator.

9. The imaging device of claim 8, further comprising a peak flicker DC voltage detector, configured to produce from the image signal a peak flicker DC voltage signal at the peak flicker DC voltage input.

10. The imaging device of claim 9, wherein the peak flicker DC voltage detector comprises:
    a first charge storage element, configured to store a first charge corresponding to the image signal during a second time period;
    a second charge storage element, configured to store a second charge corresponding to a current peak flicker DC voltage signal; and
    a second comparator, configured to compare the first charge stored in the first charge storage element and the second charge stored in the second charge storage element,
    wherein
       the first charge storage element and the second charge storage element are coupled to the peak flicker DC voltage input, and
       the first switch couples one of the first charge storage element and the second charge storage element to the second terminal of the auto zeroing comparator based upon an output of the second comparator.

11. The imaging device of claim 10, wherein the first charge storage element is a first capacitor and the second charge storage element is a second capacitor.

12. The imaging device of claim 10, further comprising a second switch, configured to couple the image signal to the first charge storage element and the second charge storage element based upon the output of the second comparator.

13. The imaging device of claim 10, wherein, based upon the output of the second comparator, the peak flicker DC voltage detector operates in a second configuration, wherein the first charge storage element is configured to store a first charge corresponding to the current peak flicker DC voltage signal and the second charge storage element is configured to store a second charge corresponding to the image signal during a second time period.

14. The imaging device of claim 8, further comprising an analog-to-digital convertor coupled to an output of the auto-zeroing comparator, wherein the image processor is configured to process an output of the analog-to-digital convertor.

15. A method, comprising:
  receiving an output signal of an image sensor, the output signal comprising a reference signal and an image signal;
  generating a combined signal by combining the image signal with a peak flicker DC voltage signal during a first time period;
  performing an auto zero function in an auto zeroing comparator during the first time period between the reference signal and the combined signal; and
  comparing the reference signal and the image signal with the auto zeroing comparator during a second time period subsequent to the first time period.

16. The method of claim 15, further comprising producing the peak flicker DC voltage signal from the image signal.

17. The method of claim 16, wherein producing the peak flicker DC voltage signal further comprises:
  storing a first charge corresponding to the image signal during a second time period;
  storing a second charge corresponding to a current peak flicker DC voltage signal;
  comparing the image signal to the current peak flicker DC voltage signal; and
  producing the greater of the image signal and the stored peak flicker DC voltage signal as the peak flicker DC voltage signal.

18. The method of claim 17, wherein the first charge corresponding to the image signal is stored in a first capacitor and the second charge corresponding to the current peak flicker DC voltage signal is stored in a second capacitor.

19. The method of claim 17, further comprising:
  operating in a first configuration, wherein the first charge corresponding to the image signal is stored in a first charge storage device and the second charge corresponding to the current peak flicker DC voltage signal is stored in a second charge storage device; and
  based upon a result of comparing the image signal to the current peak flicker DC voltage signal, operating in a second configuration, wherein the first charge corresponding to the image signal is stored in the second charge storage device and the second charge corresponding to the current peak flicker DC voltage signal is stored in the first charge storage device.

20. The method of claim 15, further comprising converting the result of comparing the reference signal and the image signal from an analog signal to a digital signal.

* * * * *